US010844182B2

(12) United States Patent
Seidel et al.

(10) Patent No.: US 10,844,182 B2
(45) Date of Patent: Nov. 24, 2020

(54) METHOD FOR PRODUCING POLYCARBONATE MOLDING COMPOSITIONS WITH IMPROVED THERMAL PROCESSING STABILITY

(71) Applicant: Covestro Deutschland AG, Leverkusen (DE)

(72) Inventors: Andreas Seidel, Dormagen (DE); Ralf Hufen, Duisburg (DE); Hans-Jürgen Thiem, Dormagen (DE); Joachim Simon, Grevenbroich (DE)

(73) Assignee: Covestro Deutschland AG, Leverkusen (DE)

( * ) Notice: Subject to any disclaimer, the term of this patent is extended or adjusted under 35 U.S.C. 154(b) by 88 days.

(21) Appl. No.: 15/769,799

(22) PCT Filed: Oct. 20, 2016

(86) PCT No.: PCT/EP2016/075236
§ 371 (c)(1),
(2) Date: Apr. 20, 2018

(87) PCT Pub. No.: WO2017/068045
PCT Pub. Date: Apr. 27, 2017

(65) Prior Publication Data
US 2019/0382541 A1    Dec. 19, 2019

(30) Foreign Application Priority Data

Oct. 23, 2015 (EP) ..................................... 15191306

(51) Int. Cl.
*C08J 3/18* (2006.01)
*C08J 3/20* (2006.01)
*C08J 3/00* (2006.01)
*C08L 69/00* (2006.01)

(52) U.S. Cl.
CPC .............. *C08J 3/203* (2013.01); *C08J 3/005* (2013.01); *C08J 3/18* (2013.01); *C08L 69/00* (2013.01); *C08J 2369/00* (2013.01); *C08J 2455/02* (2013.01); *C08L 2201/08* (2013.01)

(58) Field of Classification Search
CPC ..... C08J 3/203; C08J 3/18; C08J 3/005; C08J 2369/00; C08J 2455/02; C08L 69/00; C08L 2201/08
See application file for complete search history.

(56) References Cited

U.S. PATENT DOCUMENTS 3,419,634 A  12/1968  Vaughn, Jr.
3,553,167 A  1/1971   Schnell et al.
3,692,744 A  9/1972   Rich et al.
4,075,173 A  2/1978   Maruyama et al.
4,176,224 A  11/1979  Bier et al.
4,269,964 A  5/1981   Freitag et al.
4,311,823 A  1/1982   Imai et al.
4,334,053 A  6/1982   Freitag et al.
4,381,359 A  4/1983   Idel et al.
4,584,360 A  4/1986   Paul et al.
5,420,181 A  5/1995   Eichenauer et al.
7,943,686 B2  5/2011  Seidel et al.
9,056,977 B2  6/2015  Seidel (Continued)

FOREIGN PATENT DOCUMENTS

CA  1173998 A   9/1984
CN  104140087 A  * 11/2014 ........... C01B 25/163

(Continued)

OTHER PUBLICATIONS

International Search Report for PCT/EP2016/075236 dated Jan. 16, 2017.
Written Opinion of the International Searching Authority for PCT/EP2016/075236 dated Jan. 16, 2017.

*Primary Examiner* — Robert S Jones, Jr.
(74) *Attorney, Agent, or Firm* — Faegre Drinker Biddle & Reath LLP

(57) ABSTRACT

The invention relates to a compounding method for producing impact-modified polycarbonate compositions using components acting as an alkali or using alkaline constituent-containing components. By using the method according to the invention, the harmful influence of the components acting as an alkali on the properties of polycarbonate molding compositions or the surface of molded bodies produced therefrom is counteracted. The method has the steps (i), (ii), and optionally (iii), wherein (i) in a first step A) 10 to 98 wt. % of at least one polymer selected from the group of aromatic polycarbonates and aromatic polyester carbonates, B) 0.001 to 0.3 wt. % of at least one organic Brønsted acid, i.e. a carbon and hydrogen-containing Brønsted acid, C) 0.0001 to 0.008 wt. % of at least one inorganic Brønsted acidic phosphorus compound, i.e. a Brønsted acidic phosphorus compound which does not contain carbon, D) 1 to 90 wt. % of at least one rubber-containing vinyl(co)polymerisate, E) 0 to 90 wt. % of at least one polyester, and F) 0 to 30 wt. % of at least one additive, the ratio of the weight percentages of the components B to C used in method step (i) ranging from 2 to 100, are heated by supplying thermal and/or mechanical energy, whereby at least the components A) and D) are melted and all of the components used are mixed together, dissolved into one another, or dispersed into one another, and in an additional step (ii), the melt (ii) resulting from method step (i) is resolidified by cooling and (iii) optionally granulated. The method steps (ii) and (iii) can be carried out in any order. The invention also relates to compositions produced according to the method, to the use thereof for producing molded bodies, to the molded bodies themselves, and to the use of the mixtures of B and C for stabilizing impact-modified polycarbonate compositions.

11 Claims, No Drawings

(56) References Cited

U.S. PATENT DOCUMENTS

| | | |
|---|---|---|
| 9,617,417 B2 | 4/2017 | Avtomonov et al. |
| 9,637,632 B2 | 5/2017 | Seidel et al. |
| 2006/0287422 A1 | 12/2006 | Volkers et al. |
| 2007/0135544 A1 | 6/2007 | Seidel et al. |
| 2010/0144938 A1* | 6/2010 | Seidel ............... C08L 69/00 524/152 |
| 2010/0210789 A1* | 8/2010 | Seidel ............... B29C 48/05 525/53 |

FOREIGN PATENT DOCUMENTS

| | | |
|---|---|---|
| DE | 1900270 A1 | 11/1969 |
| DE | 1495626 B1 | 6/1971 |
| DE | 2232877 A1 | 1/1974 |
| DE | 2407674 A1 | 10/1974 |
| DE | 2407776 A1 | 9/1975 |
| DE | 2703376 A1 | 8/1977 |
| DE | 2714544 A1 | 10/1977 |
| DE | 2715932 A1 | 10/1978 |
| DE | 2842005 A1 | 4/1980 |
| DE | 3000610 A1 | 7/1980 |
| DE | 2929229 A1 | 2/1981 |
| DE | 2940024 A1 | 4/1981 |
| DE | 3007934 A1 | 9/1981 |
| DE | 3334782 A1 | 10/1984 |
| DE | 3832396 A1 | 2/1990 |
| EP | 0576950 A2 | 1/1994 |
| EP | 1893691 A1 | 3/2008 |
| GB | 1464449 A | 2/1977 |
| GB | 1552558 A | 9/1979 |
| WO | WO-2006127246 A1 | 11/2006 |
| WO | WO-2007065579 A1 | 6/2007 |
| WO | WO-2009118114 A1 | 10/2009 |
| WO | WO-2010063381 A1 | 6/2010 |
| WO | WO-2013060685 A1 | 5/2013 |
| WO | WO-2013060687 A1 | 5/2013 |

\* cited by examiner

METHOD FOR PRODUCING POLYCARBONATE MOLDING COMPOSITIONS WITH IMPROVED THERMAL PROCESSING STABILITY

The present invention relates to a compounding process for producing impact-modified polycarbonate compositions.

The present invention also relates to polycarbonate compositions, to the use of these compositions for producing molded articles and to molded articles containing these compositions and also to the use of acid mixtures for stabilizing impact-modified polycarbonate compositions The production of impact-modified polycarbonate compositions often employs components having a polycarbonate-decomposing effect or containing constituents having a polycarbonate-decomposing effect, for which, however, a further workup (purification) is not advantageous in terms of process engineering, not possible or not desired for economic reasons.

The constituents having a polycarbonate-decomposing effect which may be present in the components used for producing impact-modified polycarbonate compositions are for example manufacture-dependent impurities and/or additives added to the components.

In the context of the invention components having a polycarbonate-decomposing effect are hereinbelow to be understood as meaning components exhibiting this effect themselves and also components containing polycarbonate-decomposing constituents.

The polycarbonate-decomposing effect of the components may for example be elicited by functional groups present in these components. Such groups are alkaline for example. Examples of such functional groups are amino groups and hydroxyl groups.

By way of example, many commercially available fillers such as for example talc or other commercially available polymer additives such as for example a number of antistats (for example polyetheramides), lubricants and demolding agents (for example ethylene bisstearamide), stabilizers (for example benzotriazoles or sterically hindered amines used as light stabilizers), pigments (for example titanium dioxide), nitrogen-containing organic dyes (for example azo compounds or pyrazolones) and nitrogen-containing flame retardants (for example phosphonatamines) exhibit a polycarbonate-decomposing effect. In addition, the impact modifiers themselves, which are used in the production/compounding of impact-modified polycarbonate compositions, also often contain constituents having a polycarbonate-decomposing effect as a consequence of manufacture. These include for example polymerization assistants, for example emulsifiers, or precipitants employed in the workup processes of emulsion polymerizations. The polycarbonate itself may also contain constituents having a polycarbonate-decomposing effect as a consequence of manufacture, for example sodium hydroxide employed in washing or alkaline polymerization catalysts.

The components having a polycarbonate-decomposing effect may at high temperatures, as are typically encountered in the production and processing of the polycarbonate molding materials, elicit a catalytically induced reduction of the polycarbonate molecular weight. Such polycarbonate degradation often manifests in impairment of the properties of the molding materials or in surface changes. The choice of possible components for such polycarbonate compositions is very severely limited as a result.

It is known from the prior art to add acidic compounds to input-modified polycarbonate compositions to ameliorate the harmful effect of components having a polycarbonate-decomposing effect.

US 2006/0287422 A1 describes thermoplastic compositions containing polycarbonate, mineral fillers and an acid or an acid salt and optionally further thermoplastic polymers as blend partners, for example selected from the group containing polyester and (rubber-modified) vinyl copolymers. The application discloses that through the addition of the acid or of the acidic salt the thermally induced polycarbonate molecular weight degradation is reduced and impact strength and ductility are thus improved.

EP 1 893 691 A1 discloses compositions containing aromatic polycarbonate, aromatic polyester, filler, rubber-containing copolymers and stabilizers and also the production thereof. Stabilizers used include inter alia an aqueous solution of phosphoric acid. The compositions are suitable for producing molded articles having good mechanical properties and good surface quality.

EP 0 576 950 A2 and WO 2007/065579 A1 describe polycarbonate-ABS compositions which contain basic impurities and are stabilized with organic carboxylic acids.

WO 2010/063381 A1 describes impact-modified polycarbonate compositions having an improved combination of hydrolysis and processing stability containing polycarbonate, a base-contaminated emulsion graft polymer and an acidic phosphorus compound having at least one P—OH functionality.

WO 2009/118114 A1 discloses impact-modified polycarbonate compositions having an improved combination of light natural tone and good hydrolysis and processing stability containing polycarbonate, rubber-modified graft polymer containing manufacture-dependent residues of a fatty acid salt emulsifier, wherein the graft polymer has a pH of greater than 7 in aqueous dispersion, and an acidic additive. Disclosed as acidic additives in this application are hydroxy-functionalized mono- and polycarboxylic acids and also phosphoric acid and sodium and potassium salts of phosphoric acid.

WO 2013/060687 A1 discloses impact-modified polycarbonate compositions having a good natural tone, improved thermal stability and improved processing stability measured by the stability of the degree of gloss while varying the processing temperature containing a Brønsted-acidic compound applied to an inorganic or organic adsorber or absorber. Disclosed by way of example as Brønsted-acidic compounds are phosphoric acid, phosphorous acid, phosphinic acid and alkylated/arylated derivatives thereof.

WO 2013/060685 A1 discloses a process for producing stabilized impact-modified polycarbonate compositions in which an acidic compound in a high dilution aqueous solution is applied to a graft polymer powder before this powder thus moistened with the aqueous acid solution is subjected to compounding.

However, the use of the acids described in the prior art in processes for producing impact-modified polycarbonate compositions having good processing stability during thermoforming generally results in polycarbonate molecular weight degradation during production of the compositions by compounding provided that high temperatures are employed in the production process. However, the increase in throughput during compounding desired for increasing plant capacity results in precisely such high process temperatures. This means that the throughputs realizable when using the acids described in the prior art are generally limited. It is furthermore often necessary in compounding to achieve an optimal melting of the polymeric components of the composition and an optimal dispersing of all components which is desirable to achieve optimal material properties, for example maximum ductility, to choose the process parameters such that a high specific energy input, i.e. energy input based on the product amount put through, results. This is possible for example by choosing suitable screw configurations and/or by reducing torque at a defined throughput. It is accordingly understandable that processes for producing impact-modified polycarbonate compositions that are limited to relatively low process temperatures for achieving sufficient processing stability of the compositions during thermoforming are disadvantageous from both an economic and a technical standpoint. Furthermore, the addition of acids of the prior art often also results in disadvantageous properties for the polycarbonate compositions such as severe molecular weight degradation or occurrence of surface defects under hot and humid storage conditions, impairment of natural tone and/or a severe change in surface gloss at high processing temperatures.

It was accordingly desirable to provide a process for producing impact-modified polycarbonate compositions, optionally using components having a polycarbonate-decomposing effect, which even at high process temperatures is suitable for producing compositions having advantageous properties. These compositions produced in the process should typically feature a good thermal processing stability in downstream thermoforming processes measured by degradation of the polycarbonate molecular weight and typically be suitable for producing molded articles having a generally good surface quality (few surface defects) after hot and humid storage. The compositions produced by the process should preferably further show a good hydrolysis stability measured by degradation of the polycarbonate molecular weight under hot and humid storage conditions and a light-colored natural tone stable over a preferably wide processing window in thermoforming and the molded articles produced from the compositions should preferably exhibit a high gloss.

"High process temperatures" in the production of the impact-modified polycarbonate compositions in the context of the abovementioned problem to be addressed is to be understood as meaning temperatures measured in the melt at the die head of the compounding assembly of for example 290° C. to 310° C.

The present invention accordingly provides a process for producing impact-modified polycarbonate compositions containing the steps (i), (ii) and optionally (iii), wherein
  (i) in a first step
    A) 10 to 98 parts by weight, preferably 30 to 97 parts by weight, particularly preferably 40 to 95 parts by weight, very particularly preferably 50 to 80 parts by weight, of at least one polymer selected from the group of aromatic polycarbonates and aromatic polyester carbonates,
    B) 0.001 to 0.3 parts by weight, preferably 0.005 to 0.2 parts by weight, particularly preferably 0.01 to 0.1 parts by weight, very particularly preferably 0.02 to 0.07 parts by weight of at least one organic, i.e. carbon- and hydrogen-containing, Brønsted acid,
    C) 0.0001 to 0.008 parts by weight, preferably 0.0005 to 0.006 parts by weight, particularly preferably 0.001 to 0.005 parts by weight, very particularly preferably 0.002 to 0.004 parts by weight of at least one inorganic, i.e. non-carbon-containing, Brønsted-acidic phosphorus compound,
    D) 1 to 90 parts by weight, preferably 3 to 70 parts by weight, particularly preferably 5 to 60 parts by weight, very particularly preferably 7 to 50 parts by weight, of at least one rubber-containing vinyl (co)polymer,
    E) optionally up to 90 parts by weight, preferably up to 70 parts by weight, particularly preferably up to 60 parts by weight, particularly preferably up to 50 parts by weight, of at least one polyester,
    F) up to 30 parts by weight, preferably up to 25 parts by weight, particularly preferably 0.1 to 20 parts by weight, very particularly preferably 0.2 to 10 parts by weight, of at least one additive,
    wherein optionally at least one of the components employed in process step (i) exhibits a polycarbonate-decomposing effect,
    wherein the ratio of the weight fractions of the components B to C employed in process step (i) is in the range from 2 to 100, preferably in the range from 3 to 60, particularly preferably in the range from 5 to 50, more preferably in the range from 8 to 30,
    are heated by supplying thermal and/or mechanical energy, at least the components A) and D) are thus melted and all employed components are thus mixed with one another, dissolved in one another or dispersed in one another
    and
    in further steps (ii) and optionally (iii)
    the melt resulting from process step (i) is (ii) resolidified by cooling and (iii) optionally pelletized,
    wherein the process steps (ii) and (iii) may be performed in any desired sequence relative to one another.

Thus, in processes in which both steps (ii) and (iii) are employed, either the melt may be initially cooled and thus solidified and subsequently pelletized or else, alternatively, the melt may be cut and afterwards solidified by cooling.

One example of the former embodiment is strand pelletization while an example of the alternative embodiment is underwater pelletization.

In one embodiment process step (i) is a compounding using for example a single-screw extruder with or without kneading pins, an internal kneader, a co-kneader, a planetary screw extruder, a ring extruder or a corotating or counter-rotating, close-meshing or non-intermeshing, twin-screw or multi-screw extruder.

In a further embodiment process step (i) is a compounding using a co-kneader, a corotating twin- or multi-screw extruder or a ring extruder.

In a particular embodiment the compounding of process step (i) is effected in a corotating, close-meshing twin-screw extruder.

In a specific embodiment in process step (i) the resulting composition present as a melt is degassed by application of negative pressure.

In one embodiment the process contains the steps (i), (ii) and (iii). A process consisting of the steps (i), (ii) and (iii) is preferred.

Step (i) may employ not only the components A), B), C), D, E) and F) but also optionally further components. The components A), B), C), D, E) and F) together account for at least 80% by weight of all components employed in step (i).

In a preferred embodiment step (i) employs no further components other than A), B), C), D), E) and F).

In a further preferred embodiment step (i) does not employ the component (E).

In a further embodiment step (i) employs the component (E) and simultaneously the component D) is characterized by a gel content of at least 70% by weight, preferably at least 80% by weight, particularly preferably at least 90% by weight, in each case measured as the fraction insoluble in acetone and based on the component D).

In a further embodiment at least one of the components employed in process step (i), in particular at least one of the components selected from the group consisting of the components A, D and E, very particularly the component D, contains an alkali metal, alkaline earth metal, aluminum or transition metal salt, in particular an alkaline earth metal salt of a strong mineral acid, for example a chloride, sulfate or nitrate salt. In specific embodiments the alkaline earth metal salts are magnesium sulfate or calcium chloride, in particular magnesium sulfate.

In a further embodiment the employed sum of the components B and C is the minimum amount necessary for achieving the desired processing stability. This amount depends on the type and amounts of the components having a polycarbonate-decomposing effect employed in the respective composition and thus cannot generally be estimated but rather must be determined experimentally for the respective composition by a series of tests with different total amounts of components B and C.

In a further embodiment components B and C are employed in concentrations such that the impact-modified polycarbonate compositions produced in the process according to the invention contain the free acid of at least one of the components B and C.

Further embodiments 1 to 27 of the present invention are described below:
1. Process for producing impact-modified polycarbonate compositions containing the steps (i), (ii) and optionally (iii), wherein
   (i) in a first step
   A) 10 to 98 parts by weight of at least one polymer selected from the group of aromatic polycarbonates and aromatic polyester carbonates,
   B) 0.001 to 0.3 parts by weight of at least one organic, i.e. carbon- and hydrogen-containing, Brønsted acid,
   C) 0.0001 to 0.008 parts by weight of at least one inorganic, i.e. non-carbon-containing, Brønsted-acidic phosphorus compound,
   D) 1 to 90 parts by weight of at least one rubber-containing vinyl (co)polymer,
   E) optionally up to 90 parts by weight of at least one polyester,
   F) optionally up to 30 parts by weight of at least one additive,
      wherein the ratio of the parts by weight of the components B to C employed in process step (i) is in the range from 2 to 100,
      are heated by supplying thermal and/or mechanical energy, at least the components A) and D) are thus melted and all employed components are thus mixed with one another, dissolved in one another or dispersed in one another
      and
      in a further step (ii)
   the melt resulting from process step (i) is (ii) resolidified by cooling and (iii) optionally pelletized,
      wherein the process steps (ii) and (iii) may be performed in any desired sequence relative to one another.
2. Process according to embodiment 1, characterized in that the component B is employed in step (i) in a proportion of 0.01 to 0.1 parts by weight based on the sum of the parts by weight of the components A to F.
3. Process according to embodiment 1, characterized in that the component B is employed in step (i) in a proportion of 0.02 to 0.07 parts by weight based on the sum of the parts by weight of the components A to F.
4. Process according to any of embodiments 1 to 3, characterized in that the component C is employed in step (i) in a proportion of 0.001 to 0.005 parts by weight based on the sum of the parts by weight of the components A to F.
5. Process according to any of embodiments 1 to 3, characterized in that the component C is employed in step (i) in a proportion of 0.002 to 0.004 parts by weight based on the sum of the parts by weight of the components A to F.
6. Process according to any of the preceding embodiments, characterized in that the ratio of the components B to C is in the range from 3 to 60.
7. Process according to any of the preceding embodiments, characterized in that the ratio of the components B to C is in the range from 5 to 50.
8. Process according to any of the preceding embodiments, characterized in that the ratio of the components B to C is in the range from 8 to 30.
9. Process according to any of embodiments 1, 6, 7 or 8, characterized in that it employs component A in a proportion of 30 to 97 parts by weight, B in a proportion of 0.005 to 0.2 parts by weight, C in a proportion of 0.0005 to 0.006 parts by weight, D in a proportion of 3 to 70 parts by weight, E in a proportion of 0 to 70 parts by weight and F in a proportion of 0 to 25 parts by weight.
10. Process according to any of embodiments 1, 6, 7 or 8, characterized in that it employs component A in a proportion of 40 to 95 parts by weight, B in a proportion of 0.01 to 0.1 parts by weight, C in a proportion of 0.001 to 0.005 parts by weight, D in a proportion of 5 to 60 parts by weight, E in a proportion of 0 to 60 parts by weight and F in a proportion of 0.1 to 20 parts by weight.
11. Process according to any of embodiments 1, 6, 7 or 8, characterized in that it employs component A in a proportion of 50 to 80 parts by weight, B in a proportion of 0.02 to 0.07 parts by weight, C in a proportion of 0.002 to 0.004 parts by weight, D in a proportion of 7 to 50 parts by weight, E in a proportion of 0 to 50 parts by weight and F in a proportion of 0.2 to 10 parts by weight.
12. Process according to any of the preceding embodiments, characterized in that as component B ethylenediaminetetraacetic acid (EDTA), nitriloacetic acid, ethylene glycol bis(aminoethylether)-N,N,N',N'-tetraacetic acid (EGTA), diethylenetriaminepentaacetic acid (DTPA), phenylphosphonic acid, p-toluenesulfonic acid or a substance of general formula

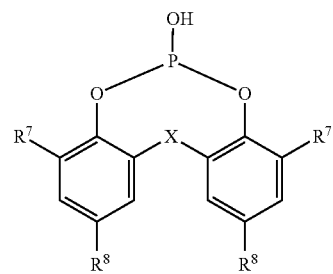

in which
R$^7$ and R$^8$ are identical or different and represent $C_1$-$C_9$-alkyl, $C_5$-$C_6$-cycloalkyl, $C_7$-$C_9$-aralkyl or $C_6$-$C_{10}$-aryl and X represents —S— or R⁹—CH where R⁹ represents hydrogen, C₁-C₆-alkyl or C₅-C₆-cycloalkyl is employed.

13. Process according to any of the preceding embodiments, characterized in that as component B the phosphorous acid ester having the structure

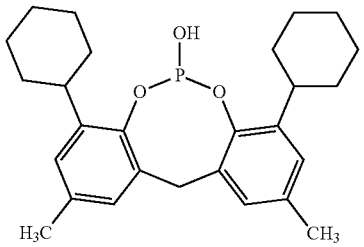 [SMILES: Cc1cc2c(c(C3CCCCC3)c1)OP(O)Oc1c(cc(C)cc1C1CCCCC1)C2]

is employed.

14. Process according to any of embodiments 1 to 12, characterized in that as component B ethylenediaminetetraacetic acid (EDTA) is employed.

15. Process according to any of the preceding embodiments, characterized in that as component C phosphorous acid (H₃PO₃) is employed.

16. Process according to embodiment 15, characterized in that the H₃PO₃ has a water content of 0.01 to 5% by weight.

17. Process according to embodiment 15, characterized in that the H₃PO₃ has a water content of 0.05 to 2% by weight.

18. Process according to any of the preceding embodiments, characterized in that at least one of the components selected from the group consisting of the components A, D and E contains an alkali metal, alkaline earth metal, aluminum or transition metal salt of a strong mineral acid.

19. Process according to embodiment 18, characterized in that the component D contains an alkali metal, alkaline earth metal, aluminum or transition metal salt of a strong mineral acid.

20. Process according to either of embodiments 18 or 19, characterized in that the salt is magnesium sulfate or calcium chloride.

21. Process according to any of the preceding embodiments, characterized in that in component F as a stabilizer at least one representative selected from the group consisting of octadecyl 3-(3,5-di-tert-butyl-4-hydroxyphenyl)propionate and tris(2,4-di-tert-butylphenyl)phosphite is employed.

22. Process according to embodiment 21, characterized in that it employs in component F pentaerythritol tetrastearate as a demolding agent, a combination of octadecyl 3-(3,5-di-tert-butyl-4-hydroxyphenyl)propionate and tris (2,4-di-tert-butylphenyl)phosphite as a stabilizer, optionally at least one pigment or colorant and no further polymer additives.

23. Process according to any of the preceding embodiments, wherein at least one of the components employed in step (i) exhibits a polycarbonate-decomposing effect.

24. Use of acid mixtures consisting of an organic, i.e. carbon- and hydrogen-containing, Brønsted acid and an inorganic, i.e. non-carbon-containing, Brønsted-acidic phosphorus compound for stabilizing impact-modified polycarbonate compositions, wherein the weight ratio of the organic Brønsted acid to the inorganic Brønsted acid is in the range from 2 to 100.

25. Compositions obtainable by any of the processes according to embodiments 1 to 23 containing a) either the components A), B), C) and D) or b) the components A), D) and the reaction products of B) and/or C) with polycarbonate-degradation-causing constituents or c) the components A), B), C), D) and reaction products of B) and/or C) with polycarbonate-degradation-causing constituents, wherein in all cases a), b) and c) the compositions optionally contain the components E) and F).

26. Use of compositions according to embodiment 25 for producing molded articles. This means a process for producing molded articles from the compositions in which the compositions are melted, brought into the desired shape and subsequently cooled.

27. Molded articles containing compositions according to embodiment 25.

Component A

Aromatic polycarbonates and/or aromatic polyester carbonates according to component A which are suitable according to the invention are known from the literature or can be produced by processes known from the literature (for production of aromatic polycarbonates see by way of example Schnell, "Chemistry and Physics of Polycarbonates", Interscience Publishers, 1964 and also DE-AS 1 495 626, DE-A 2 232 877, DE-A 2 703 376, DE-A 2 714 544, DE-A 3 000 610, DE-A 3 832 396; for production of aromatic polyester carbonates for example DE-A 3 077 934).

Aromatic polycarbonates are produced for example by reaction of diphenols with carbonyl halides, preferably phosgene and/or with aromatic diacarbonyl dihalides, preferably dihalides of benzenedicarboxylic acid, by the interfacial process, optionally using chain terminators, for example monophenols, and optionally using trifunctional or more than trifunctional branching agents, for example triphenols or tetraphenols. Production via a melt polymerization process by reaction of diphenols with, for example, diphenyl carbonate is likewise possible.

Diphenols for the production of the aromatic polycarbonates and/or aromatic polyester carbonates are preferably those of formula (I)

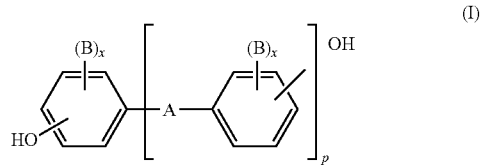

wherein

A is a single bond, C₁ to C₅-alkylene, C₂ to C₅-alkylidene, C₅ to C₆-cycloalkylidene, —O—, —SO—, —CO—, —S—, —SO₂—, C₆ to C₁₂-arylene, onto which further aromatic rings optionally containing heteroatoms may be fused, or a radical of formula (II) or (III)

-continued

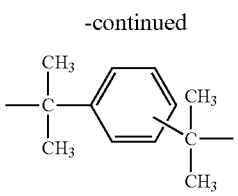
(III)

B is in each case $C_1$ to $C_{12}$-alkyl, preferably methyl, halogen, preferably chlorine and/or bromine, x is independently at each occurrence 0, 1 or 2, p is 1 or 0, and $R^5$ and $R^6$ are individually choosable for each $X^1$ and are independently of one another hydrogen or $C_1$ to $C_6$-alkyl, preferably hydrogen, methyl or ethyl, $X^1$ is carbon and m is an integer from 4 to 7, preferably 4 or 5, with the proviso that on at least one atom $X^1$, $R^5$ and $R^6$ are simultaneously alkyl.

Preferred diphenols are hydroquinone, resorcinol, dihydroxydiphenols, bis(hydroxyphenyl)-$C_1$-$C_5$-alkanes, bis(hydroxyphenyl)-$C_5$-$C_6$-cycloalkanes, bis(hydroxyphenyl) ethers, bis(hydroxyphenyl) sulfoxides, bis(hydroxyphenyl) ketones, bis(hydroxyphenyl) sulfones and α,α-bis(hydroxyphenyl)diisopropylbenzenes and also ring-brominated and/or ring-chlorinated derivatives thereof.

Particularly preferred diphenols are 4,4'-dihydroxybiphenyl, bisphenol A, 2,4-bis(4-hydroxyphenyl)-2-methylbutane, 1,1-bis(4-hydroxyphenyl)cyclohexane, 1,1-bis(4-hydroxyphenyl)-3,3,5-trimethylcyclohexane, 4,4'-dihydroxybiphenyl sulfide, 4,4'-dihydroxybiphenyl sulfone, and also the di- and tetrabrominated or chlorinated derivatives of these, for example 2,2-bis(3-chloro-4-hydroxyphenyl)propane, 2,2-bis(3,5-dichloro-4-hydroxyphenyl)propane or 2,2-bis(3,5-dibromo-4-hydroxyphenyl)propane. 2,2-Bis(4-hydroxyphenyl)propane (bisphenol A) is especially preferred.

The diphenols may be used individually or in the form of any desired mixtures. The diphenols are known from the literature or obtainable by processes known from the literature.

Examples of chain terminators suitable for producing the thermoplastic aromatic polycarbonates include phenol, p-chlorophenol, p-tert-butylphenol or 2,4,6-tribromophenol, but also long-chain alkylphenols such as 4-[2-(2,4,4-trimethylpentyl)]phenol, 4-(1,3-tetramethylbutyl)phenol according to DE-A 2 842 005 or monoalkylphenol or dialkylphenols having a total of 8 to 20 carbon atoms in the alkyl substituents, such as 3,5-di-tert-butylphenol, p-isooctylphenol, p-tert-octylphenol, p-dodecylphenol and 2-(3,5-dimethylheptyl)phenol and 4-(3,5-dimethylheptyl)phenol. The amount of chain terminators to be employed is generally between 0.5 mol % and 10 mol % based on the molar sum of the diphenols used in each case.

The thermoplastic aromatic polycarbonates may be branched in a known manner, and preferably through incorporation of 0.05 to 2.0 mol %, based on the sum of the diphenols used, of trifunctional or more than trifunctional compounds, for example those having three or more phenolic groups.

Both homopolycarbonates and copolycarbonates are suitable. Production of inventive copolycarbonates according to component A may also employ 1% to 25% by weight, preferably 2.5% to 25% by weight, based on the total amount of diphenols to be employed, of polydiorganosiloxanes having hydroxyaryloxy end groups. These are known (U.S. Pat. No. 3,419,634) and can be produced by processes known from the literature. The production of polydiorganosiloxane-containing copolycarbonates is described in DE-A 3 334 782.

Preferred polycarbonates are not only the bisphenol A homopolycarbonates but also the copolycarbonates of bisphenol A comprising up to 15 mol %, based on the molar sums of diphenols, or other diphenols mentioned as preferred or particularly preferred, in particular 2,2-bis(3,5-dibromo-4-hydroxyphenyl)propane.

Aromatic dicarbonyl dihalides for producing aromatic polyester carbonates are preferably the diacyl dichlorides of isophthalic acid, of terephthalic acid, of diphenyl ether 4,4'-dicarboxylic acid and of naphthalene-2,6-dicarboxylic acid.

Particular preference is given to mixtures of the diacyl dichlorides of isophthalic acid and of terephthalic acid in a ratio of from 1:20 to 20:1.

Production of polyester carbonates additionally makes concomitant use of a carbonyl halide, preferably phosgene, as the bifunctional acid derivative.

Chain terminators contemplated for the production of the aromatic polyester carbonates are not only the abovementioned monophenols but also the chlorocarbonic esters of these, and also the acyl chlorides of aromatic monocarboxylic acids, which can optionally have substitution by $C_1$ to $C_{22}$-alkyl groups or by halogen atoms; aliphatic $C_2$ to $C_{22}$-monocarbonyl chlorides can also be used as chain terminators here.

The amount of chain terminators is in each case 0.1 to 10 mol % based on moles of diphenol in the case of the phenolic chain terminators and on moles of dicarbonyl dichloride in the case of monocarbonyl chloride chain terminators.

The aromatic polyester carbonates may also contain incorporated aromatic hydroxycarboxylic acids.

The aromatic polyester carbonates may be either linear or else branched in a known manner (in this connection see DE-A 2 940 024 and DE-A 3 007 934).

Branching agents that may be used are for example tri- or polyfunctional carbonyl chlorides, such as trimesoyl trichloride, cyanuroyl trichloride, 3,3',4,4'-benzophenonetetracarbonyl tetrachloride, 1,4,5,8-naphthalenetetracarbonyl tetrachloride or pyromellitoyl tetrachloride, in amounts of 0.01 to 1.0 mol % (based on dicarbonyl dichlorides employed) or tri- or polyfunctional phenols, such as phloroglucinol, 4,6-dimethyl-2,4,6-tri(4-hydroxyphenyl)hept-2-ene, 4,6-dimethyl-2,4,6-tri(4-hydroxyphenyl)heptane, 1,3,5-tri(4-hydroxyphenyl)benzene, 1,1,1-tri(4-hydroxyphenyl)ethane, tri(4-hydroxyphenyl)phenylmethane, 2,2-bis[4,4-bis(4-hydroxyphenyl)cyclohexyl]propane, 2,4-bis(4-hydroxyphenylisopropyl)phenol, tetra(4-hydroxyphenyl)methane, 2,6-bis(2-hydroxy-5-methylbenzyl)-4-methylphenol, 2-(4-hydroxyphenyl)-2-(2,4-dihydroxyphenyl)propane, tetra(4-[4-hydroxyphenylisopropyl]phenoxy)methane, 1,4-bis[4,4'-dihydroxytriphenyl)methyl]benzene, in amounts of 0.01 to 1.0 mol % based on diphenols employed. Phenolic branching agents may be initially charged with the diphenols, acyl chloride branching agents may be introduced together with the acyl dichlorides.

The proportion of carbonate structural units in the thermoplastic aromatic polyester carbonates may be varied as desired. The proportion of carbonate groups is preferably up to 100 mol %, in particular up to 80 mol %, particularly preferably up to 50 mol %, based on the sum of ester groups and carbonate groups. Both the ester fraction and the carbonate fraction of the aromatic polyester carbonates may be present in the polycondensate in the form of blocks or randomly distributed.

In a preferred embodiment component A has a weight-average molecular weight Mw (determined by gel permeation chromatography (GPC) in methylene chloride with a polycarbonate standard) of 15 000 g/mol to 50 000 g/mol, preferably from 22 000 g/mol to 35 000 g/mol, in particular from 24 000 to 32 000 g/mol.

A polycarbonate or polyester carbonate or a mixture of a plurality of polycarbonates and/or polyester carbonates according to the description hereinabove may be employed as component A.

Component B

The component B is a Brønsted-acidic organic, i.e. carbon- and hydrogen-containing compound.

The component B is preferably a compound selected from the group consisting of ethylenediaminetetraacetic acid (EDTA), nitriloacetic acid, ethylene glycol bis(aminoethylether)-N,N,N',N'-tetraacetic acid (EGTA), diethylenetriaminepentaacetic acid (DTPA), phenylphosphonic acid, p-toluenesulfonic acid and substances of formula (IV), preferably ethylenediaminetetraacetic acid (EDTA) or substances of formula (IV), particularly preferably substances of formula (IV)

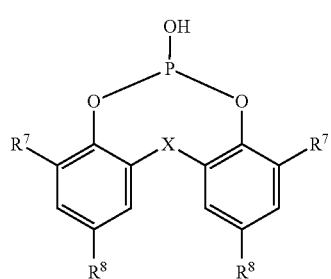

(IV)

in which
$R^7$ and $R^8$ are identical or different and represent $C_1$-$C_9$-alkyl, $C_5$-$C_6$-cycloalkyl, $C_7$-$C_9$-aralkyl or $C_6$-$C_{10}$-aryl and X represents —S— or $R^9$—CH where $R^9$ represents hydrogen, $C_1$-$C_6$-alkyl or $C_5$-$C_6$-cycloalkyl.

The phosphous acid esters of formula (IV) may be produced in a known manner by reaction of triphenyl phosphite with corresponding dihydroxyl compounds in the presence of water (cf. for example DE-A 29 29 229).

Among the compounds of formula (IV) particular preference is given to the phosphorous acid ester in which X represents methylene, $R^7$ represents cyclohexyl and $R^8$ represents methyl (formula (V)).

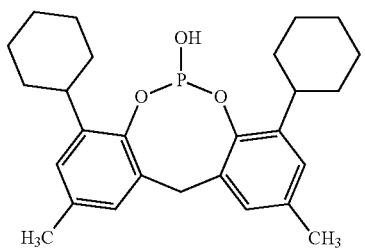 [SMILES: Cc1cc2c(c(C3CCCCC3)c1)OP(O)Oc1c(cc(C)cc1C1CCCCC1)C2]

(V)

Particularly preferably employed as component B are ethylenediaminetetraacetic acid (EDTA) or the compound of formula (V), most preferably the compound according to formula (V).

Component C

The component C is an inorganic, i.e. carbon-free, acidic phosphorus compound. Examples of such phosphorus compounds according to the invention are phosphoric acid, phosphorous acid and phosphinic acid and oligomers, polymers and acidic salts thereof.

Preferably employed as component C is phosphorous acid ($H_3PO_3$).

It is more preferable to employ $H_3PO_3$ as a solid having a water content of not more than 5% by weight, particularly preferably of not more than 2% by weight.

In a more preferred embodiment $H_3PO_3$ having a water content of 0.01% to 5% by weight, most preferably having a water content of 0.05% to 2% by weight, is employed.

Component D

The component D consists of D1 and/or D2 and optionally in addition D3.

Component D1

Employed as component D1 are graft polymers, produced in the emulsion polymerization process, of D1.1) 5% to 95% by weight, preferably 10% to 70% by weight, particularly preferably 20% to 60% by weight, based on component D1, of a mixture of D1.1.1) 65% to 85% by weight, preferably 70% to 80% by weight, based on D1.1, of at least one monomer selected from the group of the vinylaromatics (for example styrene, α-methylstyrene), ring-substituted vinylaromatics (for example p-methylstyrene, p-chlorostyrene) and (C1-C8)-alkyl methacrylates (for example methyl methacrylate, ethyl methacrylate) and D1.1.2) 15% to 35% by weight, preferably 20% to 30% by weight, based on D1.1, of at least one monomer selected from the group of the vinyl cyanides (for example unsaturated nitriles such as acrylonitrile and methacrylonitrile), (C1-C8)-alkyl (meth)acrylates (for example methyl methacrylate, n-butyl acrylate, tert-butyl acrylate) and derivatives (for example anhydrides and imides) of unsaturated carboxylic acids (for example maleic anhydride and N-phenylmaleimide) on D1.2) 95% to 5% by weight, preferably 90% to 30% by weight, particularly preferably 80% to 40% by weight, based on component D1, of at least one graft substrate.

The graft substrate preferably has a glass transition temperature <0° C., more preferably <−20° C., particularly preferably <−60° C.

Glass transition temperatures, unless otherwise stated in the present invention, are determined by means of differential scanning calorimetry (DSC) according to the standard DIN EN 61006 at a heating rate of 10 K./min, with definition of the Tg as the midpoint temperature (tangent method), and nitrogen as protective gas.

The graft particles in component D1 preferably have a median particle size (D50) of 0.1 to 0.8 μm, preferably of 0.15 to 0.6 μm, more preferably of 0.2 to 0.5 μm.

The median particle size D50 is the diameter above and below which 50% by weight of the particles respectively lie.

The graft particle size distribution and values derived therefrom are determined by ultracentrifugation (W. Scholtan, H. Lange, Kolloid, Z. and Z. Polymere 250 (1972), 782-796).

In a preferred embodiment the emulsion graft polymer according to component D1 contains less than 15% by weight, particularly preferably less than 10% by weight, very particularly preferably less than 5% by weight, based on the gel fraction of the polymer, of graft particles having a particle diameter of greater than 800 nm.

Preferred monomers D1.1.1 are selected from at least one of the monomers styrene, α-methylstyrene and methyl methacrylate; preferred monomers D1.1.2 are selected from at least one of the monomers acrylonitrile, maleic anhydride and methyl methacrylate.

Particularly preferred monomers are D1.1.1 styrene and D1.1.2 acrylonitrile.

Graft substrates D1.2 suitable for the graft polymers D1 are, for example, diene rubbers, diene-vinyl block copolymer rubbers, EP(D)M rubbers, i.e. those based on ethylene/propylene and optionally diene, acrylate rubbers, polyurethane rubbers, silicone rubbers, chloroprene rubbers and ethylene/vinyl acetate rubbers, and also mixtures of such rubbers or silicone-acrylate composite rubbers in which the silicone and acrylate components are chemically joined to one another (for example by grafting) or interpenetrate one another such that they cannot be substantially separated from one another.

Preferred graft substrates D1.2 are diene rubbers (for example based on butadiene or isoprene), diene-vinyl block copolymer rubbers (for example based on butadiene and styrene blocks), copolymers of diene rubbers with further copolymerizable monomers (for example according to D1.1.1 and D1.1.2) and mixtures of the abovementioned rubber types. Particular preference is given to pure polybutadiene rubber and styrene-butadiene block copolymer rubber.

The gel content of the graft polymers is at least 15% by weight, preferably at least 60% by weight, particularly preferably at least 75% by weight (measured in acetone).

The gel content of the graft polymers, unless otherwise stated in the present invention, is determined at 25° C. as the insoluble fraction in acetone as the solvent (M. Hoffmann, H. Krömer, R. Kuhn, Polymeranalytik I and II [Polymer Analysis I and II], Georg Thieme-Verlag, Stuttgart 1977).

The graft polymers D1 are produced by free-radical polymerization.

The graft polymer D1 generally comprises as a consequence of manufacture free copolymer, i.e. copolymer not chemically bound to the rubber substrate, of D1.1.1 and D1.1.2, which is soluble in suitable solvents (e.g. acetone).

Component D2

Employed as component D2 are graft polymers, produced in a bulk, solution or suspension polymerization process, of, D2.1) 5% to 95% by weight, preferably 80% to 93% by weight, particularly preferably 85% to 92% by weight, very particularly preferably 87% to 93% by weight, based on component D2, of a mixture of D2.1.1) 65% to 85% by weight, preferably 70% to 80% by weight, based on the mixture D.2.1 of at least one monomer selected from the group of the vinylaromatics (for example styrene, α-methylstyrene), ring-substituted vinylaromatics (for example p-methylstyrene, p-chlorostyrene) and (C1-C8)-alkyl methacrylates (for example methyl methacrylate, ethyl methacrylate) and D2.1.2) 15% to 35% by weight, preferably 20% to 30% by weight, based on the mixture D2.1 of at least one monomer selected from the group of the vinyl cyanides (for example unsaturated nitriles such as acrylonitrile and methacrylonitrile), (C1-C8)-alkyl (meth)acrylates (for example methyl methacrylate, n-butyl acrylate, tert-butyl acrylate) and derivatives (for example anhydrides and imides) of unsaturated carboxylic acids (for example maleic anhydride and N-phenylmaleimide) on D2.2) 95 to 5% by weight, preferably 20 to 7% by weight, particularly preferably 15 to 8% by weight, very particularly preferably 13 to 7% by weight, based on component D2, of at least one graft substrate.

The graft substrate preferably has a glass transition temperature <0° C., preferably <−20° C., particularly preferably <−60° C.

The graft particles in component D2 preferably have a median particle size (D50) of 0.1 to 2 µm, preferably of 0.2 to 1 µm, more preferably of 0.3 to 0.7 µm.

The graft particle size distribution and values derived therefrom are determined by ultracentrifugation (W. Scholtan, H. Lange, Kolloid, Z. and Z. Polymere 250 (1972), 782-796).

In a preferred embodiment the graft polymer according to component D2 contains less than 40% by weight, particularly preferably less than 30% by weight, in particular less than 20% by weight, based on the gel fraction of the graft polymer, of graft particles having a particle diameter of greater than 800 nm.

Preferred monomers D2.1.1 are selected from at least one of the monomers styrene, α-methylstyrene and methyl methacrylate; preferred monomers D2.1.2 are selected from at least one of the monomers acrylonitrile, maleic anhydride and methyl methacrylate.

Particularly preferred monomers are D2.1.1 styrene and D2.1.2 acrylonitrile.

Preferred graft substrates D2.2 are diene rubbers (for example based on butadiene or isoprene), diene-vinyl block copolymer rubbers (for example based on butadiene and styrene blocks), copolymers of diene rubbers with further copolymerizable monomers (for example according to D2.1.1 and D2.1.2) and mixtures of the abovementioned rubber types. Particularly preferred graft substrates D2.2 are polybutadiene rubber, styrene-butadiene block copolymer rubbers and mixtures of styrene-butadiene block copolymer rubbers with polybutadiene rubber.

The gel content of the graft polymers D2 is preferably 10 to 40% by weight, more preferably 15 to 30% by weight, most preferably 17 to 23% by weight (measured in acetone).

Particularly preferred polymers D2 are, for example, ABS polymers prepared by free-radical polymerization, which, in a preferred embodiment, contain up to 10% by weight, more preferably up to 5% by weight, more preferably 2 to 5% by weight, based in each case on the graft polymer D2, of n-butyl acrylate.

The graft polymer D2 generally comprises, as a result of the preparation, free copolymer, i.e. copolymer not chemically bound to the rubber base, of D2.1.1 and D2.1.2, which is notable in that it can be dissolved in suitable solvents (e.g. acetone).

Component D2 preferably comprises free copolymer of D2.1.1 and D2.1.2 which has a weight-average molecular weight (Mw) determined by gel permeation chromatography with a polystyrene standard of preferably 50 000 to 200 000 g/mol, particularly preferably of 70 000 to 160 000 g/mol, particularly preferably of 80 000 to 120 000 g/mol.

Component D3

Employed as component D3 are (co)polymers of at least one monomer from the group of the vinylaromatics, vinyl cyanides (unsaturated nitriles), (C1 to C8)-alkyl (meth)acrylates, unsaturated carboxylic acids and derivatives (such as anhydrides and imides) of unsaturated carboxylic acids.

Especially suitable as component D3 are (co)polymers of D3.1 50% to 99% by weight, preferably 65% to 85% by weight, particularly preferably 70% to 80% by weight based on the (co)polymer D3 of at least one monomer selected from the group of the vinylaromatics (for example styrene, α-methylstyrene), ring-substituted vinylaromatics (for example p-methylstyrene, p-chlorostyrene) and (C1-C8)-alkyl (meth)acrylates (for example methyl methacrylate, n-butyl acrylate, tert-butyl acrylate) and D3.2 1% to 50% by weight, preferably 15% to 35% by weight, particularly preferably 20% to 30% by weight based on the (co)polymer D3 of at least one monomer selected from the group of the vinyl cyanides (for example unsaturated nitriles such as acrylonitrile and methacrylonitrile), (C1-C8)-alkyl (meth)acrylates (for example methyl methacrylate, n-butyl acrylate, tert-butyl acrylate), unsaturated carboxylic acids and derivatives of unsaturated carboxylic acids (for example maleic anhydride and N-phenylmaleimide).

These (co)polymers D3 are resinous, thermoplastic and rubber-free. Particular preference is given to the copolymer of D3.1 styrene and D3.2 acrylonitrile.

(Co)polymers D3 of this kind are known and can be produced by free-radical polymerization, especially by emulsion, suspension, solution or bulk polymerization. The (co)polymers D3 have a weight-average molecular weight (Mw) determined by gel permeation chromatography with a polystyrene standard of preferably 50 000 to 200 000 g/mol, particularly preferably of 70 000 to 150 000 g/mol, particularly preferably of 80 000 to 120 000 g/mol.

Component E

The polyesters contemplated as component E according to the invention are aliphatic or aromatic polyesters, preferably aromatic polyesters and in a particularly preferred embodiment polyalkylene terephthalates. In a particularly preferred embodiment reaction products of aromatic dicarboxylic acids or reactive derivatives thereof, such as dimethyl esters or anhydrides, and aliphatic, cycloaliphatic or araliphatic diols and also mixtures of these reaction products are concerned here.

Particularly preferred polyalkylene terephthalates contain at least 80% by weight, preferably at least 90% by weight, based on the dicarboxylic acid component of terephthalic acid radicals and at least 80% by weight, preferably at least 90% by weight, based on the diol component of ethylene glycol and/or butane-1,4-diol radicals.

The preferred polyalkylene terephthalates may contain in addition to terephthalic acid radicals up to 20 mol %, preferably up to 10 mol %, of radicals of other aromatic or cycloaliphatic dicarboxylic acids having 8 to 14 carbon atoms or aliphatic dicarboxylic acids having 4 to 12 carbon atoms, for example radicals of phthalic acid, isophthalic acid, naphthalene-2,6-dicarboxylic acid, 4,4'-diphenyldicarboxylic acid, succinic acid, adipic acid, sebacic acid, azelaic acid, cyclohexanediacetic acid.

The preferred aromatic polyalkylene terephthalates may contain in addition to ethylene glycol and/or butane-1,4-diol radicals up to 20 mol %, preferably up to 10 mol %, of other aliphatic diols having 3 to 12 carbon atoms or cycloaliphatic diols having 6 to 21 carbon atoms, for example radicals of propane-1,3-diol, 2-ethylpropane-1,3-diol, neopentyl glycol, pentane-1,5-diol, hexane-1,6-diol, cyclohexane-1,4-dimethanol, 3-ethylpentane-2,4-diol, 2-methylpentane-2,4-diol, 2,2,4-trimethylpentane-1,3-diol, 2-ethylhexane-1,3-diol, 2,2-diethylpropane-1,3-diol, hexane-2,5-diol, 1,4-di(β-hydroxyethoxy)benzene, 2,2-bis(4-hydroxycyclohexyl)propane, 2,4-dihydroxy-1,1,3,3-tetramethylcyclobutane, 2,2-bis(4-β-hydroxyethoxyphenyl)propane and 2,2-bis(4-hydroxypropoxyphenyl)propane (DE-A 2 407 674, 2 407 776, 2 715 932).

The polyalkylene terephthalates may be branched through incorporation of relatively small amounts of tri- or tetrahydric alcohols or tri- or tetrabasic carboxylic acids, for example according to DE-A 1 900 270 and US B 3 692 744. Examples of preferred branching agents are trimesic acid, trimellitic acid, trimethylolethane and trimethylolpropane, and pentaerythritol.

Particular preference is given to polyalkylene terephthalates which have been produced solely from terephthalic acid and the reactive derivatives thereof (e.g. the dialkyl esters thereof) and ethylene glycol and/or butane-1,4-diol, and to mixtures of these polyalkylene terephthalates.

Mixtures of polyalkylene terephthalates contain 1% to 50% by weight, preferably 1% to 30% by weight, of polyethylene terephthalate and 50% to 99% by weight, preferably 70% to 99% by weight, of polybutylene terephthalate.

The preferably used polyalkylene terephthalates preferably have a viscosity number of 0.4 to 1.5 dl/g, preferably 0.5 to 1.2 dl/g, measured in phenol/o-dichlorobenzene (1:1 parts by weight) in a concentration of 0.05 g/ml according to ISO 307 at 25° C. in an Ubbelohde viscometer. The polyalkylene terephthalates may be produced by known methods (see, for example, Kunststoff-Handbuch, volume VIII, p. 695 et seq., Carl-Hanser-Verlag, Munich 1973).

Component F

Employable as component F are one or more further additives distinct from components A, B, C, D and E, preferably selected from the group consisting of flame retardants (for example organic phosphorus or halogen compounds, in particular bisphenol-A-based oligophosphate), anti-drip agents (for example compounds from the substance classes of fluorinated polyolefins, silicones, and also aramid fibers), flame retardant synergists (for example nanoscale metal oxides), smoke inhibitors (for example zinc borate), lubricants and demolding agents (for example pentaerythritol tetrastearate), nucleating agents, antistats, conductivity additives, stabilizers (e.g. hydrolysis, heat-aging and UV stabilizers, and also transesterification inhibitors), flow promoters, compatibilizers, further impact modifiers, further polymeric constituents (for example functional blend partners), fillers and reinforcers (for example carbon fibers, talc, mica, kaolin, $CaCO_3$) and also dyes and pigments (for example titanium dioxide or iron oxide).

In a preferred embodiment at least one polymer additive selected from the group consisting of lubricants and demolding agents, stabilizers, flow promoters, compatibilizers, further impact modifiers distinct from component D, further polymeric constituents, dyes and pigments is employed.

In a particularly preferred embodiment at least one polymer additive selected from the group consisting of lubricants and demolding agents, stabilizers, flow promoters, compatibilizers, further impact modifiers distinct from component D, further polymeric constituents, dyes and pigments, and no further polymer additives, is employed.

In a preferred embodiment pentaerythritol tetrastearate is used as a demolding agent.

In a preferred embodiment at least one representative selected from the group consisting of sterically hindered phenols, organic phosphites and sulfur-based co-stabilizers is used as a stabilizer.

In a particularly preferred embodiment at least one representative selected from the group consisting of octadecyl 3-(3,5-di-tert-butyl-4-hydroxyphenyl)propionate and tris(2,4-di-tert-butylphenyl)phosphite is used as a stabilizer.

In an especially preferred embodiment a combination of octadecyl 3-(3,5-di-tert-butyl-4-hydroxyphenyl)propionate and tris(2,4-di-tert-butylphenyl)phosphite is used as a stabilizer.

A more preferred embodiment employs pentaerythritol tetrastearate as a demolding agent, a combination of octadecyl 3-(3,5-di-tert-butyl-4-hydroxyphenyl)propionate and tris(2,4-di-tert-butylphenyl)phosphite as a stabilizer, optionally at least one pigment or colorant and no further polymer additives.

The compositions (molding materials) produced by the process according to the invention may be used for producing molded articles of any kind. These may be produced by injection molding, extrusion and blow-molding processes for example. A further form of processing is the production of molded articles by thermoforming from previously produced sheets or films.

Examples of such molded articles are films, profiles, housing parts of any type, e.g. for domestic appliances such as juice presses, coffee machines, mixers; for office machinery such as monitors, flatscreens, notebooks, printers, copiers; sheets, pipes, electrical installation ducts, windows, doors and other profiles for the construction sector (internal fitout and external applications), and also electrical and electronic components such as switches, plugs and sockets, and component parts for commercial vehicles, in particular for the automobile sector. The compositions according to the invention are also suitable for the production of the following molded articles or molded parts: internal fitout parts for rail vehicles, ships, aircraft, buses and other motor vehicles, bodywork components for motor vehicles, housings of electrical equipment containing small transformers, housings for equipment for the processing and transmission of information, housings and facings for medical equipment, massage equipment and housings therefor, toy vehicles for children, sheetlike wall elements, housings for safety equipment, thermally insulated transport containers, molded parts for sanitation and bath equipment, protective grilles for ventilation openings and housings for garden equipment.

The compositions produced by the process according to the invention are moreover particularly suitable for producing molded articles or molded parts having class A surface requirements and a high-gloss finish which may optionally be subjected partially or completely to a further surface treatment step by, for example, painting, film insert molding, metallization by vacuum deposition or electroplating.

In the context of the present invention, "high-gloss" is to be understood as meaning a gloss level determined by reflection in accordance with DIN 67530 at a measurement angle of 60° of at least 95, preferably of at least 97, particularly preferably of at least 99. The invention therefore also provides molded articles or molded parts containing at least one of the compositions according to the invention having a complete or partial high-gloss finish which have optionally been partially or completely subjected to a further surface treatment step by, for example, painting, film insert molding, metallization by vacuum deposition or electroplating.

The invention also provides the compositions produced by the process according to the invention and also molded articles or molded parts containing compositions produced by the process according to the invention.

EXAMPLES

Components Used:
Component A
Linear polycarbonate based on bisphenol A having a weight-average molecular weight Mw of 25 500 g/mol (determined by gel permeation chromatography (GPC) in a methyl chloride solvent and with a polycarbonate standard).
Component B
Phosphorous acid ester of bis(2-hydroxy-3-cyclohexyl-5-methylphenyl)methane

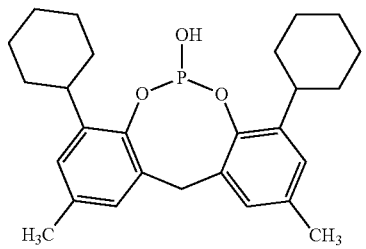

Component C
Phosphorous acid (99%), Sigma-Aldrich Chemie GmbH.
Component D
ABS blend having a ratio of acrylonitrile:butadiene:styrene, based on the blend, of 19:24:57% by weight, containing an ABS polymer according to component D1 produced by emulsion polymerization, precipitated using magnesium sulfate, worked up in a basic medium and containing basic impurities and magnesium sulfate, an ABS polymer produced by bulk polymerization according to component D2 and a SAN polymer according to component D3.
Component F1
Pentaerythritol tetrastearate as lubricant/demolding agent
Component F2
Heat stabilizer, Irganox® B900 (mixture of 80% Irgafos® 168 (tris(2,4-di-tert-butylphenyl)phosphite) and 20% Irganox® 1076 (2,6-di-tert-butyl-4-(octadecanoxycarbonylethyl)phenol); BASF (Ludwigshafen, Germany)
Component F3
Heat stabilizer, Irganox® 1076 (2,6-di-tert-butyl-4-(octadecanoxycarbonylethyl)phenol); BASF (Ludwigshafen, Germany).
Component F4
Carbon black, Black Pearls 800, Cabot Corporation (USA)
Process for Producing Compositions (Molding Materials) from the Employed Components In the first process step (i) the components A, B, C, D and F were passed into the feed zone of a twin-screw extruder (ZSK133SC) from Coperion, Werner & Pfleiderer (Stuttgart, Germany), brought to a temperature of about 300° C. with a specific energy input at the extruder drive of 145 Wh/kg in the melting and kneading zone of the extruder and thus melted, and kneaded at this temperature to disperse the plasticized components in one another. A speed of 355 min$^{-1}$ and a throughput of 5000 kg/h were employed here. The thus compounded mixture was degassed in the subsequent degassing zone of the extruder by applying a negative pressure of 200 mbar (absolute) to the melt. In the second and third process steps (ii) and (iii) the degassed melt was discharged from the extruder through a die at a temperature of about 300° C. and pelletized by underwater pelletization, cooled and thus solidified.
Production of the Test Specimens and Testing The propensity for forming surficial defects having blistering topology was evaluated on sheets having dimensions of 150 mm×105 mm×3.2 mm which were produced on an injection molding machine (from Arburg) at a melt temperature of 260° C. and a mold temperature of 80° C. An injection mold polished to a high gloss on both sides was used here. The thus produced sheets did not exhibit any surficial defects having blistering topology before hot and humid storage. Blistering was assessed visually without using magnifying technical aids (microscopes, magnifying glasses etc.) after three-day storage of these sheets under hot and humid conditions at 40° C. and a relative humidity of >95%. All visually apparent blister defects on both sides of altogether two sheets having the above-defined dimensions (i.e. on an effective surface area of 4·15 cm·10.5 cm=630 cm$^2$) were counted. From experience this purely visual assessment without magnifying technical aids accounts for all defects having a diameter above approximately 100-200 μm.

The MVR serves as a measure for any polycarbonate molecular weight degradation during the thermal stress during compounding and was determined on the pellets produced by compounding after drying at 100° C. for 4 h in a circulating air dryer according to ISO1133 at a melt temperature of 300° C. with a piston loading of 2.16 kg after a hold time of 5 min.

The iMVR was determined under the same conditions as the MVR but with a prolonged hold time of 15 min. The difference between the iMVR and the MVR serves as an indication of a thermally induced polycarbonate molecular weight degradation to be expected at high melt temperatures in the injection mold and thus as a measure of processing stability in the injection mold.

TABLE 1

|  | V1 | 2 | V3 |
|---|---|---|---|
| A | 69.00 | 68.997 | 68.988 |
| B | 0.075 | 0.05 |  |
| C |  | 0.003 | 0.012 |
| D | 29.56 | 29.56 | 29.56 |
| F1 | 0.64 | 0.64 | 0.64 |
| F2 | 0.025 | 0.05 | 0.1 |
| F3 | 0.20 | 0.20 | 0.20 |
| F4 | 0.50 | 0.50 | 0.50 |
| Formulation characteristics |  |  |  |
| B/C | ∞ | 16.7 | 0 |
| Properties |  |  |  |
| MVR [ml/10 min] | 39 | 26 | 25 |
| iMVR [ml/10 min] | 41 | 28 | 27 |
| Number of blisters | 14 | 12 | 30 |

The examples in table 1 show that only the inventive process (example 2), in which a combination of organic acidic compound and an amount of an inorganic acidic compound that is relatively small compared to the employed concentration of the organic acidic compound was used, results in the desired properties. Especially surprising here is that despite lower employed concentration of both organic acid compared to comparative example V1 and inorganic acid compared to comparative example V3 and also a lower total acid concentration compared to both comparative examples V1 and V3 a good thermal stability results.

The process using exclusively organic acid (V1) results in elevated thermally induced polycarbonate molecular weight degradation even during compounding despite already using a higher concentration of acid than in the inventive example 2. The amount of organic acid employed in inventive example 2 is thus not on its own sufficient to inhibit the thermally induced polycarbonate molecular weight degradation during compounding.

The use of exclusively inorganic acid (V3) results in inadequate blistering behavior even at a very low employed amount. Said amount was chosen such that it is still just sufficient in the chosen composition to safely inhibit thermally induced polycarbonate molecular weight degradation during compounding and during further thermal processing.

The invention claimed is:

1. A process for producing impact-modified polycarbonate compositions containing the steps (i), (ii) and optionally (iii), wherein
   (i) in a first step
   A) 10 to 98 parts by weight of at least one polymer selected from the group of aromatic polycarbonates and aromatic polyester carbonates,
   B) 0.001 to 0.3 parts by weight of ethylenediaminetetraacetic acid (EDTA),
   C) 0.0001 to 0.008 parts by weight of at least one inorganic Brønsted-acidic phosphorus compound,
   D) 1 to 90 parts by weight of at least one rubber-containing vinyl (co)polymer,
   E) optionally up to 90 parts by weight of at least one polyester,
   F) optionally up to 30 parts by weight of at least one additive,
   wherein the ratio of the parts by weight of the components B to C employed in process step (i) is in the range from 8 to 30,
   are heated by supplying thermal and/or mechanical energy, at least the components A) and D) are thus melted and all employed components are thus mixed with one another, dissolved in one another or dispersed in one another
   and
   in a further step (ii)
   the melt resulting from process step (i) is (ii) resolidified by cooling
   and (iii) optionally pelletized,
   wherein the process steps (ii) and (iii) may be performed in any desired sequence relative to one another.

2. The process as claimed in claim 1, wherein the component B is employed in step (i) in a proportion of 0.01 to 0.1 parts by weight based on the sum of the parts by weight of the components A to F.

3. The process as claimed in claim 1, wherein the component C is employed in step (i) in a proportion of 0.001 to 0.005 parts by weight based on the sum of the parts by weight of the components A to F.

4. The process as claimed in claim 1, wherein it employs component A in a proportion of 50 to 80 parts by weight, component B in a proportion of 0.02 to 0.07 parts by weight, component C in a proportion of 0.002 to 0.004 parts by weight, component D in a proportion of 7 to 50 parts by weight, component E in a proportion of 0 to 50 parts by weight and component F in a proportion of 0.2 to 10 parts by weight.

5. The process as claimed in claim 1, wherein component D contains magnesium sulfate or calcium chloride.

6. The process as claimed in claim 1, wherein in step (i) at least one component having a polycarbonate-decomposing effect is employed.

7. A method comprising stabilizing impact-modified polycarbonate compositions utilizing acid mixtures consisting of an organic Brønsted acid and an inorganic Brønsted-acidic phosphorus compound, wherein the weight ratio of the organic Brønsted acid to the inorganic Brønsted acid is in the range from 2 to 100.

8. A composition obtainable by any of the processes as claimed in claim 1.

9. A method comprising providing compositions as claimed in claim 8 and producing molded articles.

10. A molded article containing a composition as claimed in claim 8.

11. The process as claimed in claim 1, wherein component C is phosphorous acid ($H_3PO_3$) having a water content of 0.05% to 2% by weight.

* * * * *